C. W. T. KRAUSCH.

Locomotive.

No. 2,552. Reissued Apr. 9, 1867.

Witnesses
W. T. Campbell
Henry Sylvester

Inventor
C. W. T. Krausch
by atty
Mann Brinckerhoff & Lawrence

N. PETERS, PHOTO-LITHOGRAPHER, WASHINGTON, D. C.

United States Patent Office.

C. W. THEODORE KRAUSCH, OF PHILADELPHIA, PENNSYLVANIA.

*Letters Patent No.* 61,546, *dated January* 29, 1867; *reissue No.* 2,552 *dated April* 9, 1867.

IMPROVED METHOD OF INCREASING TRACTION IN LOCOMOTIVES.

The Schedule referred to in these Letters Patent and making part of the same.

TO ALL WHOM IT MAY CONCERN:

Be it known that I, C. W. THEODORE KRAUSCH, of Philadelphia, in the county of Philadelphia, and State of Pennsylvania, have invented a new and improved Mode of Increasing the Traction of Locomotive and other Draught Engines and carriages; and I do hereby declare that the following is a full and exact description thereof, reference being had to the accompanying drawings, making a part of this specification, in which—

Similar letters of reference indicate corresponding parts in the several figures.

The object of my invention is to obviate the necessity hitherto existing of constructing very heavy locomotives for drawing trains of cars on railroads, by means of a contrivance which will cause the weight of the load to be drawn to operate with greater or less pressure upon the driving-wheels of the locomotive, and thus admit of the starting and drawing of very heavy loads by means of a comparatively light locomotive. Locomotive engines, as well as engines for drawing loads on common roads, have hitherto been made very large and heavy in order to obtain the necessary amount of adhesion of the driving-wheels upon the rails or roads to move heavy loads; and in many instances, with the heaviest locomotive engines, it is found necessary to sand the rails in ascending grades for the purpose of obtaining such adhesion of the wheels. I obviate these objections by my invention, and obtain a great saving in power as well as in rolling stock by the following invention.

To enable others skilled in the art to understand my invention, I will describe several modes of carrying it into effect.

Figure 1:
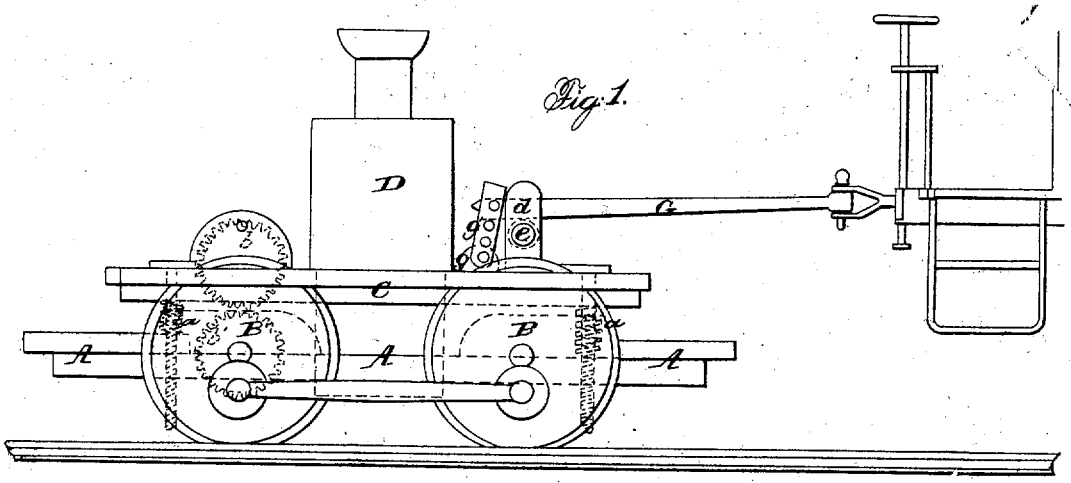
Figure 1 is a side elevation of a locomotive engine having a lever applied to it for increasing the tractive force.
Figure 2:
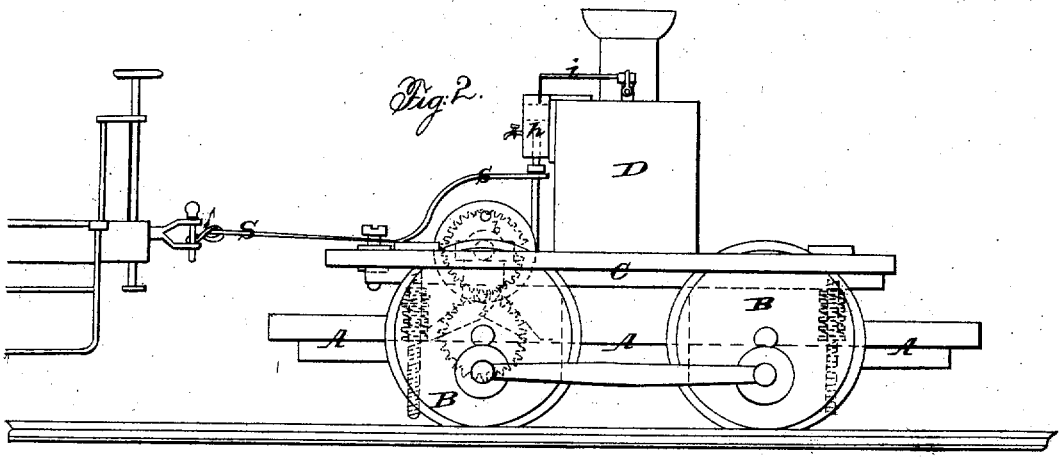
Figure 2 is a side elevation of a locomotive, showing a mode of increasing its tractive force by the application of steam to a coupling-lever.
Figure 3:
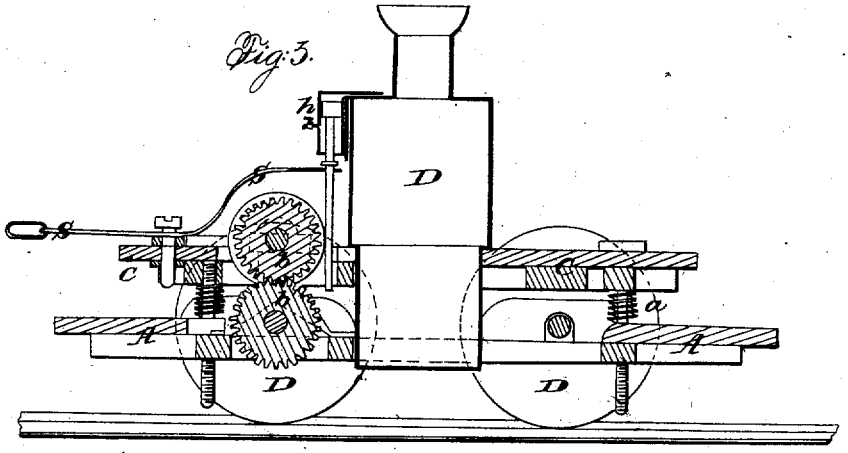
Figure 3 is a longitudinal section taken vertically through the centre of fig. 2.

The drawings represent two modes of effecting the object herein named, applied to a "driving engine," but it will be obvious from the following description that the invention is applicable to locomotive engines and other draught engines and carriages of any of the well-known forms for drawing loads on railroads or upon common roads. The principle of my invention consists in connecting the carriage upon which the engine or other driving power is applied for drawing a load to the load to be drawn, by means of a contrivance which will transfer some of the weight of the load upon the driving carriage or locomotive, and thus increase the adhesion of the driving-wheels so that they shall not slip. In fig. 1, A represents the truck-frame, which has the axles of the driving-wheels B applied to it in any suitable manner; and C is a platform or engine-frame, which is suitably mounted upon the truck-frame by means of springs *a a*, so as to have a downward elastic support. The boiler D and its appendages are mounted in any suitable manner upon the platform C; and the driving-gear *b b'* are applied so as not to be affected by the movement of the platform C, by supporting the driving-gear *b* upon the bearings, which are mounted upon the frame A, as shown in the drawings. Near one end of the platform C are erected two standards, *d d*, which support a roller, *e*. This roller is a fulcrum for a lever, G, the short arm of which is pivoted to a fixed point, *g*, on the platform by means of a link, *g'*, and the long arm is provided on its end with means for coupling it to the draw-head of a car or "tender." This lever G is allowed to move in a direction with its length, but it is so arranged that in order to do so it will bring the weight of the front end of the car to be drawn upon the platform C, and consequently upon the driving-wheels B, so as to increase their adhesion upon the rails. This motion of the lever G is effected by starting the engine, and in proportion to the amount of load to be drawn or the resistance to be overcome, so will the pressure upon the engine-frame be increased or diminished. In figs. 2 and 3 I have represented a modification of the plan of increasing adhesion of the driving-wheels upon the rails, which consists in having a piston working in a strong steam cylinder, *h*, to act upon one arm of a lever, S, the other arm of which is suitably connected to a car or tender. This lever S has its fulcrum upon the frame of the locomotive, and it is caused to act by the admission of steam into the cylinder *h*. This cylinder *h* may be supported upon the vertical boiler, as shown in figs. 2 and 3, or upon a frame which is erected upon the platform of the engine in any suitable manner, and steam may be admitted to said cylinder above its piston through a pipe, *i*, leading from the boiler, and having a cock applied to it, so that the engineman can operate the lever at will, and increase or diminish the pressure upon the engine-frame as he may desire. In the case first described, where I employ a lever which is caused to move over a fulcrum in starting the engine, the engineer cannot regulate the amount of pressure which is brought to bear upon the engine-frame except by adjusting the length of the link $g'$, when the engine is not drawing, but in the latter case above described, where steam is employed, the engineer can increase or diminish the downward pressure at pleasure while the train is at rest or in motion. Other plans than those above described may be employed for effecting the same result; for instance, a lever or arm may be secured rigidly to an engine-frame or to the frame of other draught carriage, at some suitable point on the same, and connected to one end of an engine-tender or car or other object to be drawn, in such manner that when the carriage starts a portion of the weight of the car or tender or object to be drawn will be caused to press downward upon said arm, employing for this purpose inclined planes or equivalent devices. Or in the case of city railroad cars which are drawn by a dummy engine, one end of the car may be supported upon said engine, or the engine may be arranged between two cars so that one end of each car will be supported upon the engine-frame. Instead of employing steam as a means for bringing the weight of one end of a car or "tender" or other object to be drawn to press upon the engine-frame, a screw may be employed to act upon one end of the lever S, instead of the steam piston above described. In all these plans above mentioned the forward movement of the draught carriage in starting will cause a portion of the weight of the load to be drawn to press with greater or less force upon such carriage, and increase the adhesion of the wheels and the tractive power of the engine, thus rendering it unnecessary to increase the weight of the carriage by enlarging and multiplying its parts to effect the object. The same principle can be applied in stopping a train of cars.

I do not confine my invention to a locomotive or steam carriage, as it is applicable to draught carriages of various kinds for drawing loads, such for instance as hand-power carriages which are used on railroads, and carriages which are adapted for drawing loads upon common roads. Under some circumstances, and particularly for locomotives, it will be necessary to employ a contrivance, operating upon the principles above set forth, for stopping and for backing a train of cars or other object. For this purpose the lever to which the object to be drawn is attached, should be made to transfer a portion of the weight of this object to the draught carriage, whether this object be caused to pull or to push, to move backward or forward. This may be effected by having a rolling or movable fulcrum for the transferring lever, operating in conjunction with double inclined bearings, or, if desirable, two levers may be so arranged and constructed that when the draught carriage is moved forward one lever will operate, and when this carriage is backed the other lever will operate.

Having thus described my invention, what I claim as new, and desire to secure by Letters Patent, is—

1. The means, substantially as herein described, of increasing adhesion of driving-wheels of locomotive engines or other draught carriages upon their rails or upon the ground, consisting in transferring a portion of the weight of the load to be moved to the said draught carriage, by the act of starting this carriage, substantially as described.

2. The employment of steam or other power, in conjunction with a coupling-lever S, or its equivalent, for the purpose of enabling the engineer to increase or diminish the weight upon the frame of the draught carriage at pleasure, substantially as described.

C. W. THEODORE KRAUSCH.

Witnesses:
H. RUDOLPH,
WILLIAM T. EGGLETON.